Aug. 11, 1936.  J. W. WHITE  2,050,681
BRAKE
Filed Oct. 25, 1933  3 Sheets-Sheet 1
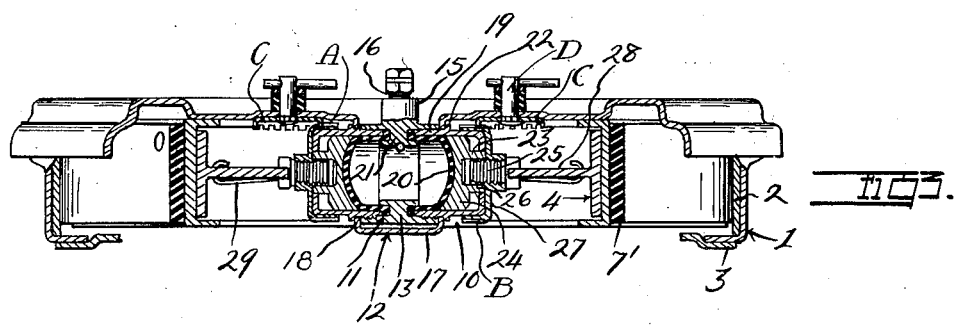
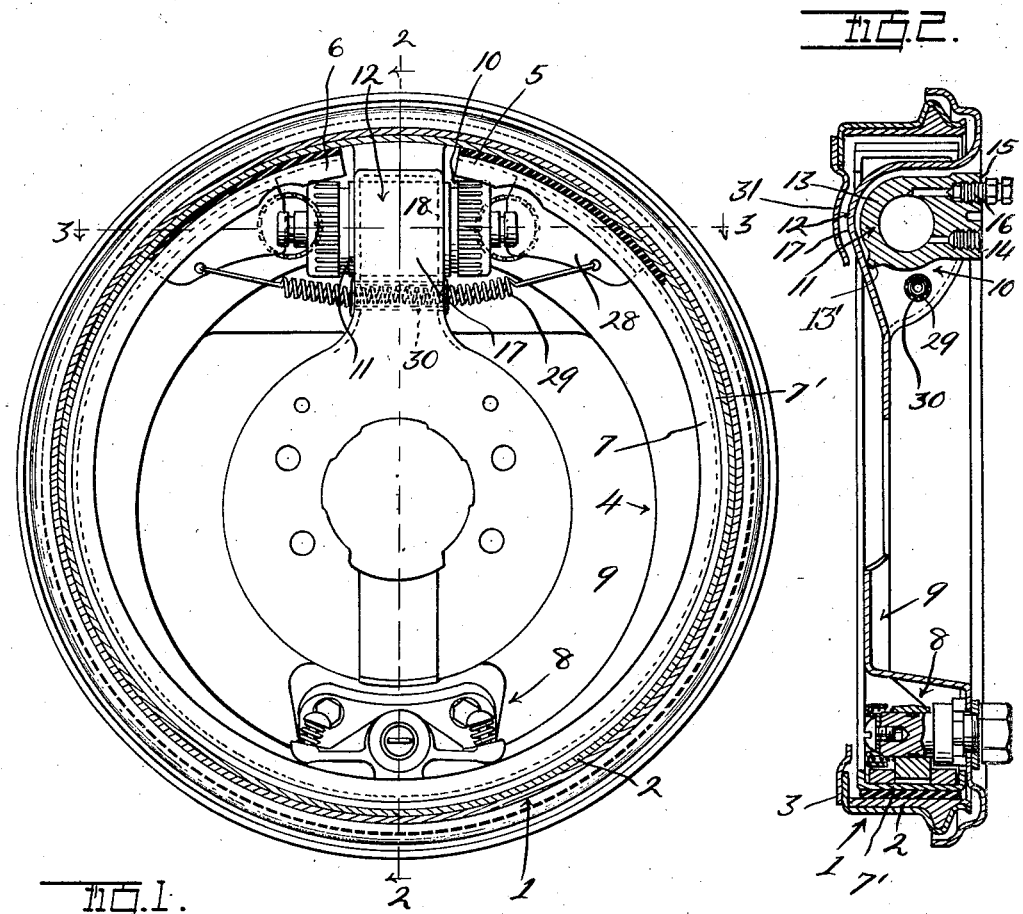
INVENTOR
John William White Aug. 11, 1936.    J. W. WHITE    2,050,681
BRAKE
Filed Oct. 25, 1933    3 Sheets-Sheet 2

INVENTOR
John William White
BY
ATTORNEYS

Aug. 11, 1936.                J. W. WHITE                2,050,681
                                BRAKE
                       Filed Oct. 25, 1933         3 Sheets-Sheet 3
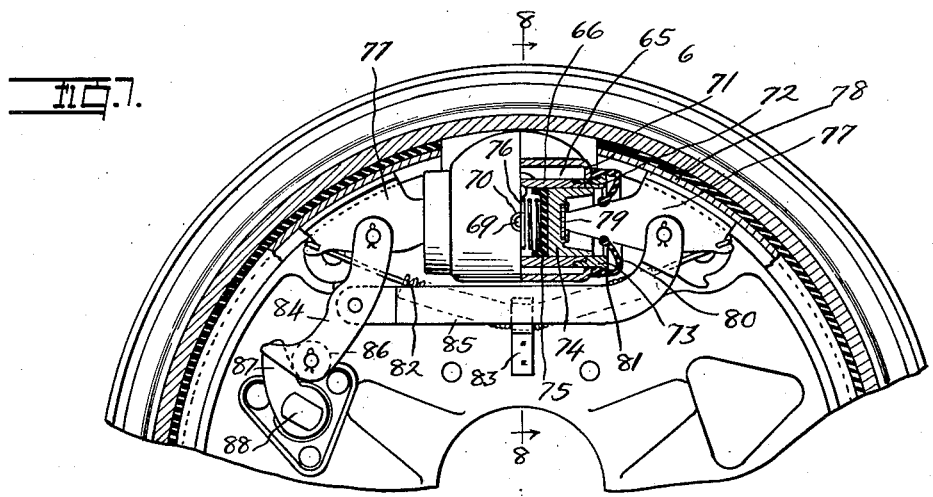
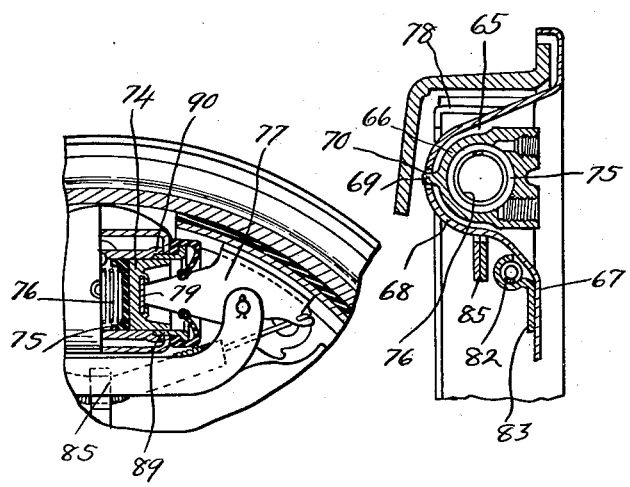
INVENTOR
John William White
BY
ATTORNEYS Patented Aug. 11, 1936

2,050,681

UNITED STATES PATENT OFFICE 2,050,681

BRAKE

John William White, Detroit, Mich., assignor, by mesne assignments, to General Motors Corporation, a corporation of Delaware Application October 25, 1933, Serial No. 695,176

16 Claims. (Cl. 188—106)

The invention relates to brake constructions and refers more particularly to vehicle brake constructions of that type in which the brake friction means is within and movable outwardly into frictional contact with the brake flange of the brake drum.

Heretofore, in brake constructions in which the brake friction means have been operated by direct acting actuators, the actuators have been located at the inner sides of the backing plates and within the brake drums, so that they have been subject to the heat generated inside the brake drums. In constructions in which the actuators are operated by hydraulic pressure, this arrangement is dangerous, both because of the danger of vaporizing the actuating fluid and the danger of deteriorating the actuators and particularly any of their parts formed of material, such as rubber. This is especially true of the smaller brake constructions. To illustrate the danger, the average actuating liquid formed of denatured alcohol and castor oil vaporizes in the neighborhood of 180 degrees F., while that formed of diacetone, alcohol and castor oil vaporizes in the neighborhood of 270 degrees F. and rubber of the best type deteriorates in the neighborhood of 250 degrees F., or slightly thereabove. Also the air temperatures inside the brake drum assembly have been observed as high as 500 degrees F. after severe tests. Therefore, it is apparent that continued application of the brake for a long period is dangerous.

One of the objects of my invention is to provide an improved actuator for the brake friction means. Another object is to provide an improved manner of mounting the actuator so that the actuator is substantially within the confines of the brake drum and practically outside the backing plate for the brake drum, the construction being such that the actuator may be of the direct acting type and does not form any appreciable obstruction outside the confines of the brake drum and the backing plate. The construction is also such that the actuator is protected from the heat generated within the brake drum and may also be cooled by the air outside the brake drum.

These and other objects of the invention will become apparent from the following description, taken in connection with the accompanying drawings, in which Figure 1 is a sectional elevation of a brake construction showing an embodiment of my invention;

Figures 2 and 3 are cross sections on the lines 2—2 and 3—3 respectively of Figure 1;

Figures 4, 5, 6, 7 and 9 are views similar to Figure 1 showing other embodiments of my invention;

Figure 8 is a cross section on the line 8—8 of Figure 7.

Figure 4:
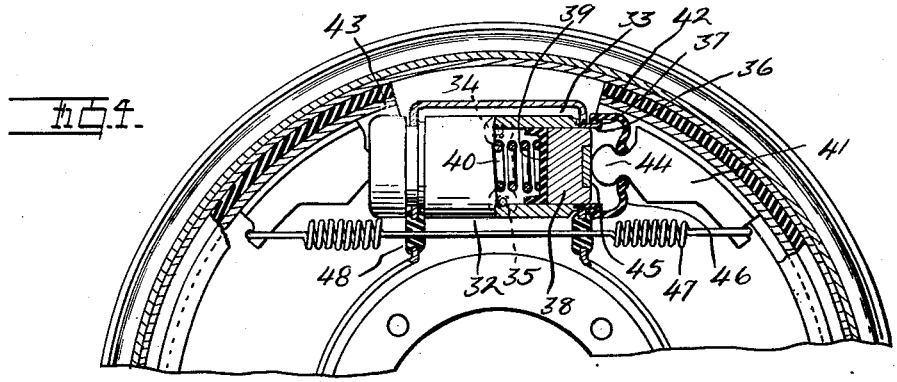

Referring to Figures 1, 2 and 3, I is the brake drum of the brake construction adapted to be secured to a wheel of a motor vehicle and having the annular brake flange 2 and the back 3. 4 is the brake friction means within the brake drum and having the separable ends 5 and 6. The friction means, as illustrated, is in the nature of the transversely split flexible band 7 and the lining 7' secured to this band, the latter being adapted to be forced outwardly into frictional contact with the brake flange 2. At the side of the axis of the brake drum opposite the ends 5 is the rockable mounting 8 for the portion of the friction means intermediate its ends, this mounting being upon the backing plate 9 and providing for outward movement of the intermediate portion of the friction means upon circumferential movement thereof.

10 is the actuator for the friction means. This actuator is mounted upon the backing or supporting plate 9 between and in line with the ends 5 and 6 of the friction means and is adapted to spread apart these ends. The actuator comprises the tubular housing element 11 which is mounted upon the backing plate at the outer side thereof substantially within the confines of the brake drum, the backing plate being provided with the axially recessed or depressed portion 12 extending within the confines of the brake drum and receiving the housing element. This housing element has the inner side wall 13 and also has extending integrally therefrom and at the side opposite the side wall 13 the lower and upper bosses 14 and 15, respectively, which extend axially of the brake drum. The lower boss 14 has a passageway communicating with the interior of the housing element and adapted to conduct actuating fluid under pressure into the housing element. The upper boss 15 is provided with a bleed passageway communicating with the interior of the housing element and normally closed by a suitable valve, such as the valve 16. It will be noted that these bosses are within the confines of the backing plate, so that they form no obstruction beyond these confines. The inner side wall 13 is spaced from the adjacent side wall 17 of the recessed portion 12 to provide a substantial air gap therebetween and in order to insure this spaced relationship, a suitable projection 13' may be formed on the wall 13 in a position to engage the backing plate.

The recessed portion 12 has the end walls 18 which are formed with axially aligned apertures and the ends of the housing element 11 are secured against these end walls concentric with the apertures, the housing element having a length such that it may be laterally inserted between the end walls. 19 are cylindrical retainers which extend through the axially aligned apertures in the end walls of the recessed portion and threadedly engage the interiors of the end portions of the housing element 11 and clamp the flexible cup-shaped diaphragms 20, which are preferably formed of rubber, within annular grooves formed by the inwardly extending central portion 21 of the housing element. These retainers are provided with the shoulders 22 which extend radially outwardly and are preferably annular and these shoulders are so positioned with respect to the retainers that they act as stops engageable with the end walls 18 of the recessed portion after the diaphragms have been sufficiently pinched to insure an effective seal between these diaphragms and the housing element. The retainers are cup-shaped and their outer ends are preferably provided with suitable means for engagement by a tool, such as a spanner wrench, to facilitate screwing the retainers into the housing element. The outer ends of the retainers are provided with axially aligned openings through which are adapted to extend the reduced portions or stems 23 of the pistons 24. These pistons are slidable within the retainers and abut the diaphragms. 25 are screws extending freely into the axial recesses 26 at the outer ends of the pistons. 27 are nuts threaded upon the screws and abutting the outer ends of the pistons. The outer ends of the screws are operatively connected to the brackets 28 secured to the ends 5 and 6 of the friction means, the outer ends of the screws, as shown, being slotted to receive the brackets.

The nuts 27 are provided with tubular portions A sleeved over the extremities of the cylinder retainers 19 and having the outer surfaces thereof serrated to form teeth B extending axially of the hydraulic cylinder. The teeth B on each of the nuts are engaged by a suitable toothed member C and both of the toothed members are mounted for rotation about horizontal axes extending at substantially right angles to the axis of the hydraulic cylinder. As shown in Figure 3 the toothed members are secured to suitable stub shafts D journaled upon the backing plate in such a manner that the same are accessible for rotation from a position exteriorly of the drum. By reason of the foregoing construction rotation of the toothed members effects a corresponding rotation of the nuts 27, and since the screws 25 upon which the nuts are threaded are fixed against rotation, the screws will be moved axially with respect to the hydraulic brake cylinder. Axial displacement of the screws provides for varying the clearance between the brake friction means and the brake surface of the drum, since the head portions of the screws are operatively connected to the free ends of the friction means.

The arrangement is such that the diaphragms 20 form with the central portion 21 of the housing element a chamber adapted to receive the actuating fluid and this chamber is entirely within the confines of the recessed portion 12 of the backing plate. The arrangement is such that when the actuating fluid is forced into the chamber the diaphragms 20 are extended and force the pistons 24 outwardly, which through the nuts 27 force the screws 25 outwardly to spread apart the ends of the friction means. The nuts are rotatable to provide for predetermined clearance between the friction means and the annular flange of the brake drum. Also with this construction the ends of the retainers form abutments for limiting the retracting movement of the ends of the friction means.

29 is the retracting spring for the friction means, its opposite ends engaging the brackets 28. The central portion of this spring extends through the recessed portion 12, the end walls of which latter are provided with axially aligned openings radially inwardly of the openings through which the retainers extend. 30 is a ferrule having an internal diameter sufficient to provide for the passage therethrough of the retracting spring. The ferrule is preferably formed of metal and it extends between the end walls of the recessed portion and through the radially innermost openings, it being spun over at its ends to secure the same in place. With this construction, the ferrule prevents dirt, water and the like from passing into the interior of the brake drum through the radially inward openings. The retracting spring is bowed radially inwardly from its ends, so that it exerts a retracting force upon the ends of the friction means tending to move these ends toward each other and also radially inwardly.

For the purpose of providing clearance between the recessed portion 12 of the backing plate and the back 3 of the brake drum and also to reinforce the brake drum, I have provided the hollow annular rib 31 in the back concentric with its axis.

With the above construction, the actuator and more particularly the portion thereof forming the chamber for receiving the actuating fluid and the bosses having the fluid passageways therethrough and communicating with the chamber are located outside the backing plate and the side wall of this chamber is spaced from the backing plate, so that the backing plate functions to protect the actuator and more particularly its more sensitive parts or the parts thereof which might be affected most from the heat generated within the brake drum by the application of the friction means. More in detail, the backing plate is exposed directly to the heat and the actuator and its more sensitive parts are not exposed directly to the heat. While the backing plate may conduct a small amount of the heat to the actuator and its sensitive parts, the backing plate acts principally as an agent to conduct heat away from the actuator. Since the actuator and its sensitive parts are exposed to the air outside the brake drum assembly any heat conducted to the same may be more readily dissipated. As a result, the danger of vaporization of the actuating liquid, either in the chamber for receiving the actuating liquid or the passageways directly communicating with this chamber, and of deteriorating the rubber diaphragms forming part of this chamber is avoided.

Figure 4 discloses another construction of actuator having the tubular housing element 32 which is in the nature of a cylinder. This housing element is also mounted upon the backing plate at the outer side thereof and substantially within the confines of the brake drum, the backing plate being provided with the recessed portion 33 extending within the confines of the brake drum and receiving the housing element. The housing element has the lower and upper bosses 34 and 35 respectively extending integrally therefrom axially of the brake drum and corresponding substantially to the lower and upper bosses 14 and 15 respectively of the modification shown in Figures 1, 2 and 3. Air gaps are also provided between the side wall of the housing element and recessed portion and the side walls of the recessed portion and the back of the brake drum. The ends of the housing element are secured against the end walls of the recessed portion concentric with the axially aligned apertures in these end walls. 36 are rings extending through the axially aligned apertures and abutting the ends of the housing element 32, the inner faces of these rings registering with the inner face of the housing element and the outer ends of these rings being formed with the radially outwardly extending annular flanges 37. 38 are pistons slidable within the opposite end portions of the housing element 32 and 39 are yieldable cups preferably formed of rubber secured against the inner faces of the pistons by the coil spreader spring 40. The chamber formed within the housing element 32 and between the piston cups 39 is adapted to receive the actuating fluid. 41 are brackets secured to the separable ends 42 and 43 of the friction means, these brackets being formed with the heads 44 abutting the wear plates 45 in the outer ends of the pistons. For protecting the outer ends of the housing element and the contact surfaces of the wear plates and heads, I have provided the flexible cup-shaped shields or covers 46 which are preferably formed of rubber and which embrace the necks of the heads 44 and extend over the annular flanges 37 and embrace the main portions of the rings 36.

The ends of the housing element 32, the end walls of the recessed portion of the backing plate and the inner ends of the rings 36 are fixedly secured in place preferably by welding the same to each other.

47 is the retracting spring for the friction means, the ends of this spring being hooked over ears upon the brackets 41 and the central portion of this spring extending through the recessed portion of the backing plate radially inside the actuator. This central portion is preferably straight, the portions of the spring between this central portion and the end portions and outside the recessed portion being coiled. 48 are grommets preferably formed of rubber encircling the central portion of the spring and filling the openings in the end walls of the recessed portion through which this central spring portion extends, these grommets being constructed to allow assembly of the spring.

It will be seen that the construction of Figure 4 is such that it obtains all of the advantages of the construction shown in Figures 1, 2 and 3, in that the actuator and more particularly the housing element of the actuator in which is formed the chamber for receiving the actuating liquid is outside the brake drum and protected from the heat generated therewithin by the backing or supporting plate. It will also be seen that the bosses having the passageways communicating with the chamber are outside the brake drum and also protected in the same manner from the heat generated within the brake drum. It will be further seen that the backing plate functions to conduct the heat away from the housing element and the bosses and particularly the piston cups within the housing element to protect the same.

Figure 5:
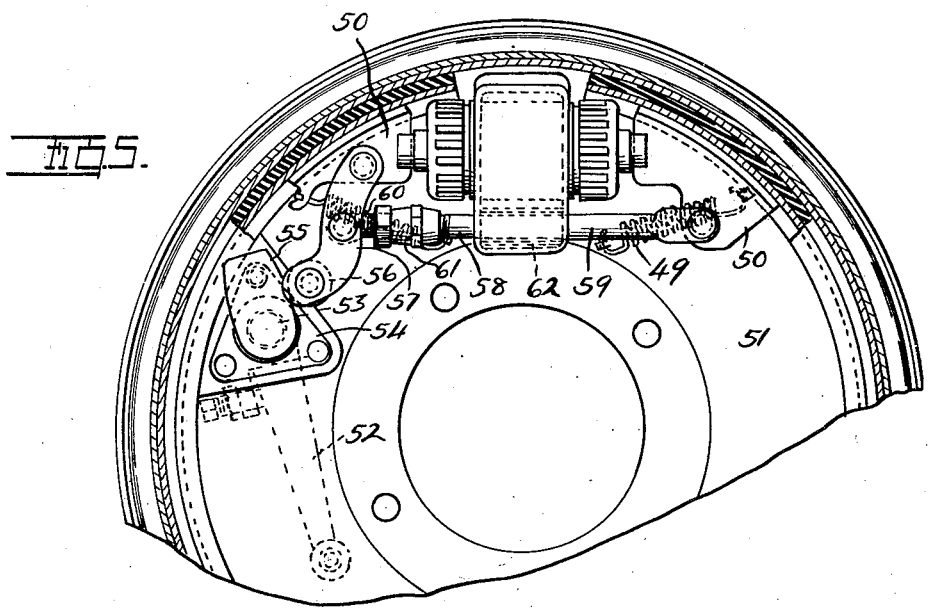

The construction shown in Figure 5 differs essentially from that shown in Figures 1, 2 and 3, in that it incorporates a parking or emergency brake operating device. The retracting means for the friction means, instead of being in the nature of a single coil spring, comprises the coil spring 49 connected at one end to each bracket 50 at an end of the friction means and connected at the other end to the backing plate 51. The parking or emergency brake operating device comprises the operating lever 52 which is secured to the shaft 53 mounted upon the bracket 54 carried by the backing plate 51. 55 is a crank or cam secured to the shaft 53 inside the brake drum and engageable with the roller 56. This roller is mounted at one end of the lever 57, the other end of this lever being pivotally mounted upon the adjacent bracket 50. 58 is a rod extending through the recessed portion of the backing plate and pivotally connected to the lever 57 intermediate its ends and to the bracket 50 at the other side of the recessed portion. This rod is preferably made adjustable and, as shown, comprises the round section 59 which extends through the recessed portion of the backing plate and the round section 60, the two being adjustably connected by the coupling or nut 61. A suitable lock nut may be provided upon one of these round sections and engageable with the coupling or nut to lock the parts in their adjusted positions. The ferrule 62, similar to the ferrule 30, seals the openings in the end walls of the recessed portion through which the round section 50 extends.

Figure 6:
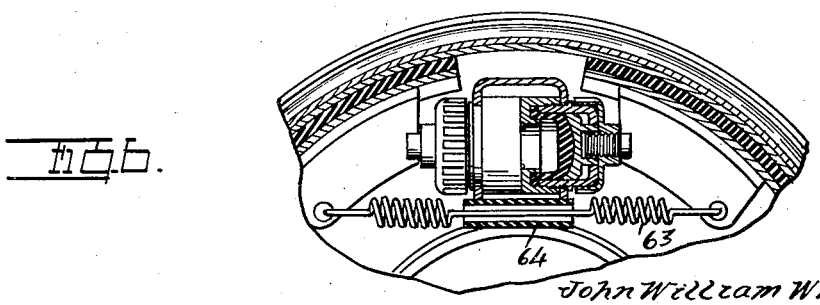

The construction illustrated in Figure 6 differs essentially from that shown in Figures 1, 2 and 3 in that the retracting means for the brake friction means comprises the coil spring 63, its central portion straight, and its portions between the central portion and the ends coiled. For closing the openings in the end walls of the recessed portion through which the retracting spring extends, I provide the tube 64 which extends through the recessed portion and the openings of its end walls. This tube formed of rubber is preferably flexible so that it can be stretched over either of the coiled portions of the retracting spring to provide for assembly.

If desired, the ferrules 30 and 62, shown respectively in Figures 1 and 5, may also be rubber tubes similar to the tube 64.

The construction shown in Figures 7 and 8 is similar to that shown in Figure 5 in that both the hydraulic and mechanical actuators are adapted to actuate the brake. 65 is the hydraulic actuator similar to that shown in Figure 4, and having the tubular housing element 66 in the nature of a cylinder. This housing element is mounted upon the backing or supporting plate 67 at the outer side thereof and within the confines of the brake drum, the backing plate having the axially recessed or depressed portion 68 extending within the brake drum for receiving the housing element. Air gaps are provided between the side walls of the housing element and recessed portion and the side wall of the recessed portion and the back of the brake drum. The housing element has the projection 69 which extends axially of the brake drum and into the aperture 70 formed in the wall of the recessed portion to hold the housing element from rotation. The length of the housing element is such that it may be inserted laterally into place between the end walls 71 of the recessed portion and concentric with the axially aligned apertures 72 in these end walls. 73 are rings or sleeves extending through the apertures and telescopically engaging the ends of the housing element, the inner faces of the rings and housing element registering. As shown, the telescoping portions of the housing element and rings are rabbeted and the rings encircle the housing element. The rings preferably have a press fit with both the end walls and the housing element. 74 are pistons slidable within the opposite end portions of the housing element 66 and 75 are yieldable cups preferably formed of rubber secured against the inner faces of the pistons by the coil spreader spring 76. 77 are brackets secured to the separable ends 78 of the friction means, these brackets having projections or heads abutting the wear plates 79 in the outer ends of the pistons. Flexible cup-shaped shields or covers 80, preferably formed of rubber, embrace the necks of the projections and extend over the annular flanges 81 at the outer ends of the rings.

82 is the retracting spring for the friction means, its ends being hooked over ears upon the brackets and its central portion being offset axially of the brake drum toward the backing plate and being secured to the latter radially inwardly of the recessed portion 68 by the clamp 83. This clamp is suitably secured, as by welding, to the backing plate.

The mechanical actuator comprises the lever 84 which is pivotally mounted at its upper end upon a bracket 77 and the lever or rod 85 which is pivotally connected at one end to the intermediate portion of the lever 84 and at the other end to the other bracket 77. The lever or rod 85 passes the recessed portion 68 radially inwardly thereof. The lower end of the lever 84 has mounted thereon the roller 86 which is engaged by the crank or cam 87 upon the shaft 88 journalled on and extending through the backing plate.

The modification shown in Figure 9 differs from that of Figures 7 and 8 mainly in that the rings 89 extend into the end portions of the tubular housing element 90. These rings also have a press fit with the end walls of the recessed portion of the backing plate and the housing element.

What I claim as my invention is:

1. The combination with a brake drum, a backing plate having a recess formed with side and end walls and brake friction means within said drum, said end walls having aligned openings therethrough, of a tubular housing element mounted on said plate at the outer side thereof and located substantially within said recess and secured solely at its ends to the end walls of said recess concentric with the openings therethrough and reciprocable means within said housing element and operatively connected to said friction means for actuating the latter.

2. The combination with a brake drum, a backing plate having a recess formed with side and end walls and brake friction means within said drum, of a tubular housing element located in said recess and secured solely at its ends to the end walls of said recess, and reciprocable means within said housing element for actuating said friction means.

3. The combination with a brake drum, a backing plate having a recess substantially within the confines of said drum and formed with side and end walls and brake friction means within said drum, of a housing element mounted on said plate at the outer side thereof and located substantially within said recess and having its ends secured to the end walls of said recess, reciprocable means extending within said housing element and extending through the end walls of said recess and operatively connected to said friction means for actuating the latter, and another housing element for said reciprocable means within the space between the end walls of said recess and said drum, said other housing element constituting means for securing the first housing element as set forth.

4. The combination with a brake drum, a backing plate having a recess substantially within the confines of said drum and formed with a side wall and apertured end walls, and brake friction means within said drum, of a cylinder located substantially within said recess and having its ends engaging the end walls thereof, rings extending through the apertures of the end walls and secured to the ends of said cylinder forming extensions of the latter, pistons within said cylinder, means between said pistons and friction means for actuating the latter from the former, and flexible covers secured to said rings and last mentioned means.

5. The combination with a brake drum, a backing plate having a recess substantially within the confines of said drum and formed with apertured end walls, and brake friction means within said drum, of a cylinder mounted on said plate at the outer side thereof and located substantially within said recess, cylindrical retainers extending through the apertures in the end walls of said recess and engaging said cylinder and clamping its ends against the end walls of said recess, and reciprocable means within the space formed by said cylinder and retainers operatively connected to said friction means for actuating the latter.

6. The combination with a brake drum, a backing plate having a recess substantially within the confines of said drum and brake friction means within said drum, of a hydraulic actuator for said friction means mounted on said plate at the outer side thereof and located substantially within said recess, and a mechanical actuator for said friction means comprising a member extending through said recess.

7. The combination with a brake drum, a backing plate having a recessed portion substantially within the confines of said drum, and brake friction means within said drum, of an actuator for said friction means mounted on said plate at the outer side thereof and located substantially within said recessed portion, means extending through openings in said recessed portion for moving said friction means, and means encircling said last mentioned means and closing the openings.

8. The combination with a brake drum, a backing plate having a recessed portion substantially within the confines of said drum, and brake friction means within said drum, of an actuator for said friction means mounted on said plate at the outer side thereof and located substantially within said recessed portion, a spring extending through openings in said recessed portion for retracting said friction means, and means encircling said spring and closing the openings.

9. The combination with a brake drum, a backing plate having a recessed portion substantially within the confines of said drum, and brake friction means within said drum, of a hydraulic actuator for said friction means mounted on said plate at the outer side thereof and located substantially within said recessed portion, a mechanical actuator for said friction means comprising a member extending through openings in said recessed portion, and means encircling said last mentioned member and closing the openings.

10. The combination with a brake drum, a backing plate having a recessed portion substantially within the confines of said drum, and brake friction means within said drum, of an actuator for said friction means mounted on said plate at the outer side thereof and located substantially within said recessed portion, means extending through openings in said recessed portion for moving said friction means, and a tubular member encircling said last mentioned means and extending into and closing the openings.

11. The combination with a brake drum, a backing plate having a recessed portion substantially within the confines of said drum, and brake friction means within said drum, of an actuator for said friction means mounted on said plate at the outer side thereof and located substantially within said recessed portion, means extending through openings in said recessed portion for moving said friction means, and grommets encircling said last mentioned means and closing the openings.

12. The combination with a brake drum, a backing plate having a recessed portion substantially within the confines of said drum, and brake friction means within said drum, of an actuator for said friction means mounted on said plate at the outer side thereof and located substantially within said recessed portion, a spring extending through openings in said recessed portion for retracting said friction means, and a flexible tube encircling said spring and extending into and closing the openings.

13. The combination with a brake drum, a backing plate having a recessed portion substantially within the confines of said drum, and brake friction means within said drum, of an actuator for said friction means mounted on said plate at the outer side thereof and located substantially within said recessed portion, a spring extending through openings in said recessed portion for retracting said friction means, and a ferrule encircling said spring and extending into and closing the openings.

14. The combination with a brake drum, a backing plate having a recessed portion substantially within the confines of said drum, and brake friction means within said drum, of a hydraulic actuator for said friction means mounted on said plate at the outer side thereof and located substantially within said recessed portion, a mechanical actuator for said friction means comprising a member extending through openings in said recessed portion, and a ferrule encircling said last mentioned member and extending into and closing the openings.

15. The combination with a brake drum, a backing plate having a recessed portion substantially within the confines of said drum, and brake friction means within said drum, of a hydraulic actuator for said friction means mounted on said plate at the outer side thereof and located substantially within said recessed portion, a mechanical actuator for said friction means comprising a member extending through openings in said recessed portion, and a flexible tubular member encircling said last mentioned member and extending into and closing the openings.

16. The combination with a brake drum, a backing plate having a depressed portion with side and end walls and brake friction means within said drum, said end walls having openings therethrough, of a housing element extending into the recess formed by said depressed portion and between said end walls, tubular members extending through said openings and engaging said housing element and securing the same to said backing plate, and means extending within said housing element and tubular members for actuating said friction means.

JOHN WILLIAM WHITE.